United States Patent
Tsukatani et al.

(10) Patent No.: US 9,062,251 B2
(45) Date of Patent: Jun. 23, 2015

(54) PHOSPHOR PARTICLES, LIGHT-EMITTING DIODE, AND ILLUMINATING DEVICE AND LIQUID CRYSTAL PANEL BACKLIGHT DEVICE USING THEM

(75) Inventors: Toshihiko Tsukatani, Echizen (JP); Kazuhiro Wataya, Echizen (JP)

(73) Assignee: SHIN-ETSU CHEMICAL CO., LTD., Tokyo (JP)

( * ) Notice: Subject to any disclaimer, the term of this patent is extended or adjusted under 35 U.S.C. 154(b) by 84 days.

(21) Appl. No.: 13/156,811

(22) Filed: Jun. 9, 2011

(65) Prior Publication Data

US 2011/0305005 A1    Dec. 15, 2011

(30) Foreign Application Priority Data

Jun. 9, 2010    (JP) ................. 2010-131609

(51) Int. Cl.
   *G02F 1/13357*   (2006.01)
   *C09K 11/78*   (2006.01)
   *H01J 1/62*   (2006.01)
   *C09K 11/77*   (2006.01)

(52) U.S. Cl.
   CPC ......... *C09K 11/7774* (2013.01); *C09K 11/7769* (2013.01)

(58) Field of Classification Search
   None
   See application file for complete search history.

(56) References Cited

U.S. PATENT DOCUMENTS

| | | | |
|---|---|---|---|
| 4,479,886 A * | 10/1984 | Kasenga | 252/301.4 R |
| 5,644,193 A | 7/1997 | Matsuda et al. | |
| 5,851,428 A | 12/1998 | Matsuda et al. | |
| 5,998,925 A | 12/1999 | Shimizu et al. | |
| 6,660,185 B2 * | 12/2003 | Hampden-Smith et al. | 252/301.4 R |
| 7,018,564 B2 * | 3/2006 | Moon et al. | 252/301.36 |
| 8,083,968 B2 * | 12/2011 | Fukuta et al. | 252/301.4 R |
| 2004/0046497 A1 * | 3/2004 | Schaepkens et al. | 313/506 |
| 2006/0273286 A1 | 12/2006 | Delespierre et al. | |
| 2010/0053932 A1 | 3/2010 | Emoto et al. | |

FOREIGN PATENT DOCUMENTS

| | | |
|---|---|---|
| EP | 0221562 A2 | 5/1987 |
| EP | 1854863 A1 | 11/2007 |
| JP | 01-108294 A | 4/1989 |
| JP | 06-009956 A | 1/1994 |
| JP | 09-235547 A | 9/1997 |
| JP | 2002-267800 A | 9/2002 |
| JP | 2004-162057 A | 6/2004 |
| JP | 3700502 B2 | 9/2005 |
| JP | 2006-41096 A | 2/2006 |
| JP | 2007-002086 A | 1/2007 |
| JP | 2007-513038 A | 5/2007 |

(Continued)

OTHER PUBLICATIONS

Milosevic et al. J. Electrochem. Soc., 152 (9) G707 (2005).*
European Search Report dated Sep. 7, 2011, issued in corresponding European Patent Application No. 11169218.2.
Japanese Office Action dated Aug. 22, 2012, issued in corresponding Japanese Patent Application No. 2011-120117.

(Continued)

*Primary Examiner* — J. L. Yang
(74) *Attorney, Agent, or Firm* — Westerman, Hattori, Daniels & Adrian, LLP

(57) ABSTRACT

Phosphor particles of generally spherical shape have an average particle diameter of 5-50 μm and an average roundness of up to 0.3. The phosphor includes a garnet phase having formula: $(A_{1-x}B_x)_3C_5O_{12}$ wherein A is Y, Gd, or Lu, B is Ce, Nd, or Tb, C is Al or Ga, and $0.002 \leq x \leq 0.2$.

14 Claims, 2 Drawing Sheets

(56) References Cited

FOREIGN PATENT DOCUMENTS

| JP | 2008-007390 | A | | 1/2008 | | |
| WO | 2008/062781 | A1 | | 5/2008 | | |
| WO | WO 2009/113379 | A1 | * | 9/2009 | ............. | C09K 11/80 |

OTHER PUBLICATIONS

Japanese Office Action dated Apr. 16, 2013, issued in corresponding Japanese Patent Application No. 2011-120117 (5 pages).

* cited by examiner

PHOSPHOR PARTICLES, LIGHT-EMITTING DIODE, AND ILLUMINATING DEVICE AND LIQUID CRYSTAL PANEL BACKLIGHT DEVICE USING THEM

CROSS-REFERENCE TO RELATED APPLICATION

This non-provisional application claims priority under 35 U.S.C. §119(a) on Patent Application No. 2010-131609 filed in Japan on Jun. 9, 2010, the entire contents of which are hereby incorporated by reference.

TECHNICAL FIELD

This invention relates to phosphor particles suitable for use in illuminating devices such as general purpose light sources, backlight sources and headlight sources, and light-emitting diodes, and more particularly in illuminating devices including a phosphor capable of converting the wavelength of emission from a light source, and white light-emitting diodes; a light-emitting diode using the particles; and an illuminating device and a liquid crystal panel backlight unit using the light-emitting diode.

BACKGROUND ART

Light-emitting diodes (LEDs) are the most efficient among currently available light sources. In particular, white LEDs find a rapidly expanding share in the market as the next-generation light source to replace incandescent lamps, fluorescent lamps, cold cathode fluorescent lamps (CCFL), and halogen lamps. The white LEDs are arrived at by combining a blue LED with a phosphor capable of emission upon blue light excitation. Examples of yellow light-emitting phosphors known to produce pseudo-white light in combination with blue LEDs include $Y_3Al_5O_{12}$:Ce, $(Y,Gd)_3(Al,Ga)_5O_{12}$:Ce, $(Y,Gd)_4Al_5O_{22}$:Ce, $Tb_3Al_5O_{12}$:Ce, $CaGa_2S_4$:Eu, $(Sr,Ca,Ba)_2SiO_4$:Eu, and Ca-α-SiAlON:Eu.

JP-B-3700502 discloses a method for preparing a phosphor by dissolving rare earth elements Y, Gd, and Ce in stoichiometric proportions in an acid, coprecipitating the solution with oxalic acid, firing the coprecipitate to obtain an oxide of the coprecipitate, mixing it with aluminum oxide, and adding ammonium fluoride as flux thereto. The mixture is placed in a crucible and fired in air at 1,400° C. for 3 hours. The fired material is wet milled in a ball mill, washed, separated, dried, and finally sieved.

When a phosphor is synthesized by such a conventional process of particle mixing and solid-phase reaction, phosphor properties are often degraded because some particles may be left unreacted and ball milling can detract from crystallinity and generate fines. The particles have irregular shape and a broad particle size distribution, indicating the presence of phosphor particles of widely varying size. When such phosphor particles are dispersed in a resin which is used for the encapsulation of LEDs, the amount, distribution and particle size of the phosphor in the resin widely vary. This leads to variations in the chromaticity of white LED and causes a reduction of production yield.

Citation List
Patent Document 1: JP-B-3700502

SUMMARY OF INVENTION

An object of the invention is to provide phosphor particles which can be dispersed in media for light emitting diodes such as resins for encapsulating a light emitter, resins and inorganic glasses for dispersing phosphor particles, while minimizing a variation in the amount, distribution and particle size of phosphor particles; a light-emitting diode including the particles and exhibiting a minimal variation of chromaticity; and an illuminating device and a liquid crystal panel backlight unit using the light-emitting diode.

The inventors have found that generally spherical phosphor particles having an average particle size of 5 to 50 μm and an average roundness of up to 0.3 can be dispersed evenly in media such as resins and inorganic glass, with a minimal variation in the amount, distribution and particle size of phosphor particles. Specifically it has been found that phosphor particles having such properties and including a garnet phase having the compositional formula (1) defined below are advantageously used in white LED construction as a yellow light-emitting phosphor capable of emission upon excitation by light from a blue LED.

In one aspect, the invention provides phosphor particles of generally spherical shape including a garnet phase having the compositional formula (1):

$$(A_{1-x}B_x)_3C_5O_{12} \tag{1}$$

wherein A is at least one rare earth element selected from the group consisting of Y, Gd, and Lu, B is at least one rare earth element selected from the group consisting of Ce, Nd, and Tb, C is at least one element selected from the group consisting of Al and Ga, and x is a number of 0.002 to 0.2, the phosphor particles having an average particle size of 5 to 50 μm and an average roundness of up to 0.3.

In a preferred embodiment, the phosphor powder has a particle size dispersion index of 0.1 to 0.7, a bulk density of 1.3 to 4 g/cm³, and/or an angle of repose of 1° to 40°.

In another aspect, the invention provides a light-emitting diode including a layer of the phosphor particles on a light emitter capable of emitting excitation light. The layer is typically a layer of the phosphor particles dispersed in a resin or inorganic glass.

In a further aspect, the invention provides an illuminating device including the phosphor particles.

Also contemplated herein are a backlight unit for use in liquid crystal panels, including the light-emitting diode and an illuminating device including the light-emitting diode.

ADVANTAGEOUS EFFECTS OF INVENTION

The phosphor particles of the invention can be dispersed in media such as resins and inorganic glass, with a minimal variation in the amount, distribution and particle size of phosphor particles. The phosphor particles may be used to manufacture a light-emitting diode, an illuminating device and a liquid crystal panel backlight unit, featuring a minimal variation of chromaticity.

DESCRIPTION OF EMBODIMENTS

Figure 1:
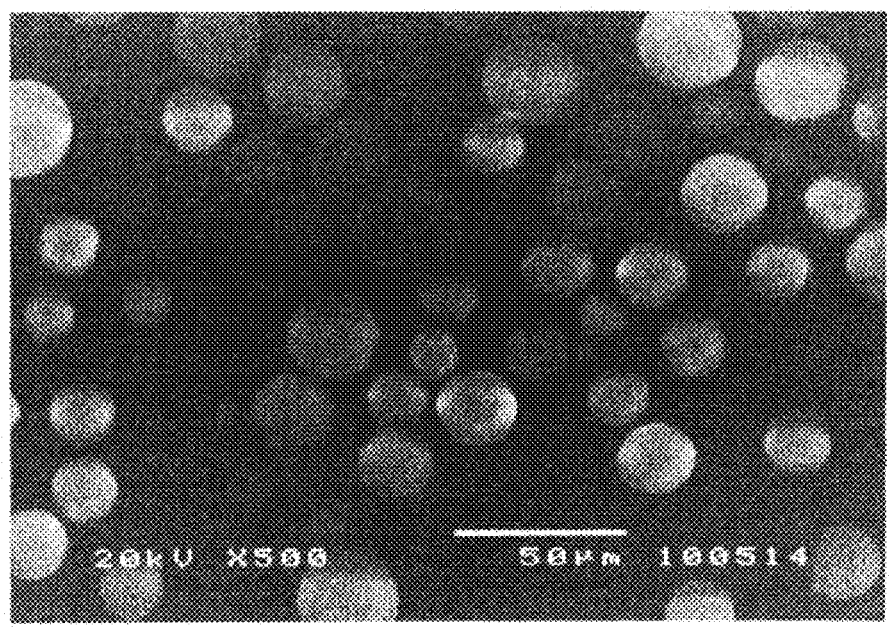
FIGS. 1 and 2 show electron micrographs of phosphor particles obtained in Example 2 and Comparative Example 1, respectively.

As used herein, the term "phosphor" refers to a fluorescent substance. The terms "particles" and "powder" are equivalent in that the powder is a grouping of particles. As used herein for modifying particle shape, the term "generally spherical" refers to spherical and substantially spherical shape.

The phosphor powder consisting of generally spherical fluorescent particles has an average particle size of 5 to 50 μm and a dispersion index of preferably 0.1 to 0.7, and more preferably 0.2 to 0.5. The average particle size may be determined as a median diameter D50 (a particle size at cumulative 50% by volume). The dispersion index is defined by the equation:

dispersion index=$(D90-D10)/(D90+D10)$ wherein D10 and D90 are particle sizes at cumulative 10 vol % and 90 vol % in the particle size distribution, respectively. The average particle size, D10 and D90 may be determined from particle size distribution measurement by laser diffractometry.

The phosphor particles have an average roundness of equal to or less than 0.3, preferably equal to or less than 0.2, and more preferably equal to or less than 0.1. Although the lower limit of average roundness is ideally 0, it is typically equal to or more than 0.01. The roundness may be determined from a projection image of particles as observed under an electron microscopy. For each particle, diameters of a circumscribed circle and an inscribed circle are measured. The roundness is determined from the equation:

roundness={(circumscribed circle diameter)−(inscribed circle diameter)}/[{(circumscribed circle diameter)+(inscribed circle diameter)}÷2].

The phosphor powder should preferably have a bulk density of 1.3 to 4 g/cm$^3$, more preferably 1.5 to 3.5 g/cm$^3$, and even more preferably 1.8 to 3 g/cm$^3$ and an angle of repose of 1° to 40° and more preferably 1° to 35°.

When an encapsulating resin is filled with phosphor particles, a phosphor powder having a small angle of repose, i.e., high fluidity or a high bulk density can be loaded in a reproducible manner. Then an encapsulating resin-based phosphor layer may be formed thin. Since the encapsulating resin can be discolored due to thermal or UV degradation, a reduced amount of encapsulating resin provides a prolonged lifetime for LEDs. Also, the phosphor powder having a low dispersion index and a narrow particle size distribution ensures that when a white LED capable of emitting pseudo-white light is constructed by combining a blue LED with a yellow light-emitting phosphor, the white LED exhibits color uniformity between blue and yellow colors.

The phosphor particles are preferably particles of oxide phosphor, typically particles of phosphor including a garnet phase having the compositional formula (I):

$(A_{1-x}B_x)_3C_5O_{12}$            (1)

wherein A is at least one rare earth element selected from Y, Gd and Lu, B is at least one rare earth element selected from Ce, Nd and Tb, C is at least one element selected from Al and Ga, and x is a number from 0.002 to 0.2 (i.e., 0.002≤x≤0.2). The garnet phase is the main phase of the phosphor particle. Usually the garnet phase preferably accounts for at least 99% by volume of the particle. Also silicate-based phosphors such as $(Ba,SrCa)_2SiO_4$:Eu and $(Ba,Sr,Ca)_3SiO_5$:Eu may be suitably used as the phosphor.

It is now described how to produce phosphor particles. Phosphor particles are prepared by first selecting a metal oxide(s) from single metal oxides, composite metal oxides, and metal oxide mixtures in accordance with the metal species in the desired phosphor particles, forming a slurry of the oxide(s), and granulating the slurry, the resulting granules being used as a precursor.

The composite metal oxide or metal oxide mixture may be prepared, for example, by the following method. A co-precipitate is first prepared by selecting suitable metal salts from salts of metal elements to constitute the phosphor particles (for example, nitrates and chlorides of Y, Gd, Lu, Ce, Nd, Al, Ga, etc.), dissolving the metal salts in water, and co-precipitating the aqueous solution. Alternatively, it may be prepared by selecting suitable starting materials from the metal salts and metal oxides described above, forming an aqueous solution or slurry thereof, and co-precipitating the aqueous solution or slurry. The resulting co-precipitate is fired at 800 to 1,500° C. in air, obtaining the composite oxide or oxide mixture. The firing time is usually 1 to 10 hours.

If necessary, organic additives such as dispersant and binder may be added to the oxide slurry. The slurry may be optionally milled into a slurry of fine particles preferably having an average particle size of 0.01 to 2.0 μm. By a granulation technique, generally spherical granules (precursor) of the desired particle size may be prepared from the slurry. Suitable granulation techniques include air atomizing (or two-fluid) nozzle, four-fluid nozzle, fluidized-bed granulation, centrifugal atomization, tumbling granulation, agitation granulation, compression granulation (such as by rubber or isostatic pressing), extrusion granulation, and disintegration granulation. The granules are compositionally uniform among them due to granulation from slurry. The granules preferably have a size substantially equivalent to the phosphor particles obtained therefrom after heat treatment, specifically an average particle size corresponding to 100 to 120% of that of phosphor particles after heat treatment.

The granules are agglomerates in which fines are merely coalesced. According to the invention, the granules are heat treated into sintered or integral particles serving as phosphor particles. For example, the granules are placed in a ceramic crucible or sagger where they are heat treated at 1,000 to 1,900° C. in air, a reducing atmosphere or vacuum. The heat treatment time is usually 1 to 20 hours. In case the granules are obtained from a slurry containing organic additives, they may be previously fired at 400 to 1,700° C. for 1 to 10 hours in air to burn off the organic matter before heat treatment in a reducing atmosphere or vacuum.

For the heat treatment in a reducing atmosphere, the reducing gas used herein may be $H_2+N_2$ gas, $H_2+Ar$ gas or the like. The heat treatment for chemical reduction is carried out at a temperature of 1,300 to 1,800° C. for a time of 1 to 20 hours sufficient to acquire desired fluorescent properties.

Also preferably the heat treatment of the granules into sintered or integral particles may be carried out by passing the granules through a gas burner flame (e.g., propane) or plasma for melting. The plasma source used herein may be a high-frequency plasma or direct-current plasma. In this case, the granules may be once completely melted in their entirety before integral particles are formed. Alternatively, only a surface portion of individual fines of agglomerates is melted such that fines may be fused together whereupon sintered particles in which fines are tightly consolidated are obtained. Also in this case, the granules may be pre-fired at 400 to 1,700° C. for 1 to 10 hours prior to the flame or plasma treatment.

In a further method, metals of which the desired oxide phosphor is composed are combined in a predetermined atomic ratio and melt mixed in a vacuum melting furnace to form an alloy melt. The alloy melt is cast in a mold to form an alloy rod or wire. The alloy rod or wire is processed by a rotary disc atomizer to form generally spherical metal (alloy) particles having an average particle size equal to or less than 50 μm. The metal particles are fired at a temperature less than or equal to the melting point of the alloy in an oxidizing atmosphere or ambient atmosphere to convert the metal into oxide. Since the resulting oxide reflects the shape of the alloy and the starting material is monodisperse alloy, generally spherical particles are obtained in unfused form. Depending upon the type of activator added, the oxide particles may be annealed in an oxidizing or reducing atmosphere for the purpose of yielding phosphor particles having a high emission efficiency.

In a still further method, generally spherical oxide particles may be obtained from solid-phase reaction. First a wet precipitation technique is used to prepare generally spherical oxide particles of the formula $(A_{1-x}B_x)_2O_3$ (wherein A is at least one rare earth element selected from Y, Gd and Lu, B is at least one rare earth element selected from Ce, Nd and Tb, and x is a number from 0.002 to 0.2) having an average particle size of 5 to 55 µm, or generally spherical particles of metal salt (e.g., metal oxalate) as precursor to the oxide. Particles of aluminum oxide and/or gallium oxide having an average particle size of 0.01 to 5 µm are added to the precipitated particles, which are fired for solid-phase reaction to take place.

The phosphor particles of the invention may be used in a light-emitting device, typically LED. For example, the phosphor particles are suited for use as a wavelength converting material to form a layer on a light emitter capable of emitting excitation light and typically as a phosphor for wavelength conversion of LED. When phosphor particles are dispersed in media such as resins (e.g., epoxy resins and silicone resins) and inorganic glass in order to overlay the light emitter with a phosphor layer, advantageously the particles are uniformly dispersed in the medium and uniformly distributed in the layer. The layer is characterized by a minimized variation of phosphor particle distribution.

The phosphor particles are suited as a phosphor for converting the wavelength of light from a light-emitting element of an LED. Thus, the phosphor particles can be advantageously used in an LED, and an illuminating device and a backlight device for liquid crystal panels may be fabricated using the LED.

EXAMPLE

Examples of the invention are given below by way of illustration and not by way of limitation. YAG designates yttrium-aluminum garnet. LuAG designates lutetium-aluminum garnet.

Example 1

A 99.9% purity yttrium oxide ($Y_2O_3$) powder having an average particle size of 1.0 µm, a 99.0% purity aluminum oxide ($Al_2O_3$) powder having an average particle size of 0.5 µm and a 99.9% purity cerium oxide ($CeO_2$) powder having an average particle size of 0.2 µm were combined in a molar ratio of Y:Al:Ce=2.94:5:0.06 to form a powder mixture. The powder mixture, 1,000 g, was combined with 1,500 g of deionized water, 10 g of poly(ammonium acrylate), and 2 g of carboxymethyl cellulose and milled in a ball mill for 6 hours. The resulting slurry was granulated through a two-fluid nozzle, obtaining granules having an average particle size of 15 µm. The granules were heat treated in air at 1,000° C. for 2 hours to burn off the organic matter. Subsequent heat treatment in vacuum at 1,600° C. for 5 hours yielded phosphor particles. The phosphor particles were qualitatively analyzed by XRD, finding a YAG phase as the main phase.

The phosphor particles were observed under an electron microscope. They were spherical or substantially spherical. The particle size of phosphor particles was determined from an electron micrograph image, from which an average roundness was computed. A particle size distribution was measured by the laser diffraction method, from which an average particle size and a dispersion index were computed. The phosphor particles were also measured for a bulk density and an angle of repose. The results are shown in Table 1.

An internal quantum efficiency of the phosphor particles was measured over an emission wavelength range of 480 to 780 nm at an excitation wavelength of 450 nm using an integrating sphere. The result is also shown in Table 1.

Example 2

In a ball mill, 1,000 g of 99.9% purity $Y_{2.94}Ce_{0.06}Al_5O_{12}$ garnet powder having an average particle size of 1.0 µm was milled with 1,500 g of deionized water, 10 g of poly(ammonium acrylate) and 2 g of carboxymethyl cellulose for 6 hours. The resulting slurry was granulated through a centrifugal atomizer, obtaining granules having an average particle size of 24 µm. The granules were heat treated in air at 1,600° C. for 2 hours to burn off the organic matter. The granules were fed into a DC arc plasma, melted therein, and solidified again. The solidified particles were collected as phosphor particles. The phosphor particles were qualitatively analyzed by XRD, finding YAG phase (garnet phase) as the main phase. The particles were annealed at 1,400° C. for 4 hours in a reducing atmosphere of 98% by volume argon and 2% by volume hydrogen, resulting in a phosphor capable of emitting yellow light when excited with blue light.

The phosphor particles were observed under an electron microscope. The electron micrograph is shown in FIG. 1. The phosphor particles were spherical or substantially spherical. An average particle size, dispersion index, roundness, bulk density, angle of repose and internal quantum efficiency were measured as in Example 1. The results are shown in Table 1.

Example 3

A tantalum crucible was charged with 7,840 g of 99.9% purity yttrium, 4,044 g of 99.9% purity aluminum, and 252 g of 99.9% purity cerium, which were melted in vacuum for alloying. The alloy melt was cast in a mold of 20 mm diameter to form an alloy bar. Using a rotary disc atomizer, the alloy bar was processed into spherical or substantially spherical fine particles. There were contained particles of irregular shape. Using an inclined plate, irregular shape particles were separated from spherical or substantially spherical particles. The alloy particles thus obtained had an average particle size of about 35 µm. The alloy particles were slowly heated to 1,500° C. in an air furnace, and then cooled.

The phosphor particles were spherical or substantially spherical when observed under an electron microscope, and consisted of YAG phase on XRD qualitative analysis. The particles were annealed at 1,500° C. for 4 hours in a reducing atmosphere of 98% by volume argon and 2% by volume hydrogen, resulting in a phosphor capable of emitting yellow light when excited with blue light. An average particle size, dispersion index, roundness, bulk density, angle of repose and internal quantum efficiency were measured as in Example 1. The results are shown in Table 1.

Example 4

Spherical particles of 99.9% purity $Y_{1.94}Ce_{0.04}O_3$ having an average particle size of 15 µm were synthesized. Aluminum oxide ($Al_2O_3$) having an average particle size of 0.01 µm, 75.3 g, was added to 100 g of the spherical particles. The mixture was heat treated at 1,600° C. for 2 hours. The resulting particles were spherical or substantially spherical when observed under an electron microscope and consisted of YAG phase on XRD qualitative analysis. The particles were annealed at 1,500° C. for 4 hours in a reducing atmosphere of 98% by volume argon and 2% by volume hydrogen, resulting in a phosphor capable of emitting yellow light when excited with blue light. An average particle size, dispersion index, roundness, bulk density, angle of repose and internal quantum efficiency were measured as in Example 1. The results are shown in Table 1.

Example 5

In a ball mill, 1,000 g of 99.9% purity $Lu_{2.94}Ce_{0.06}Al_5O_{12}$ garnet powder having an average particle size of 1.0 µm was milled with 1,500 g of deionized water, 10 g of poly(ammonium acrylate) and 2 g of carboxymethyl cellulose for 6 hours. The resulting slurry was granulated through a centrifugal atomizer, obtaining granules having an average particle size of 25 µm. The granules were heat treated in air at 1,600° C. for 2 hours to burn off the organic matter. The granules were fed into a DC arc plasma, melted therein, and solidified again. The solidified particles were collected as phosphor particles. The phosphor particles were qualitatively analyzed by XRD, finding LuAG phase (garnet phase) as the main phase. The particles were annealed at 1,400° C. for 4 hours in a reducing atmosphere of 98% by volume argon and 2% by volume hydrogen, resulting in a phosphor capable of emitting yellow-green light when excited with blue light.

An average particle size, dispersion index, roundness, bulk density, angle of repose and internal quantum efficiency of the phosphor particles were measured as in Example 1. The results are shown in Table 1.

Comparative Example 1

A 99.9% purity yttrium oxide ($Y_2O_3$) powder having an average particle size of 1.0 µm, a 99.0% purity aluminum oxide ($Al_2O_3$) powder having an average particle size of 0.5 µm and a 99.9% purity cerium oxide ($CeO_2$) powder having an average particle size of 0.2 µm were combined in a molar ratio of Y:Al:Ce=2.94:5:0.06 to form a powder mixture. The powder mixture, 1,000 g, was further combined with 20 g of barium fluoride ($BaF_2$) as flux, fully mixed, and placed in an alumina crucible where it was heat treated in air at 1,400° C. for 5 hours. The fired material was milled in water on a ball mill, washed with water, separated, dried, and sieved, yielding phosphor particles. On XRD qualitative analysis, the phosphor particles were found to contain YAG phase (garnet phase) as the main phase.

Figure 2:
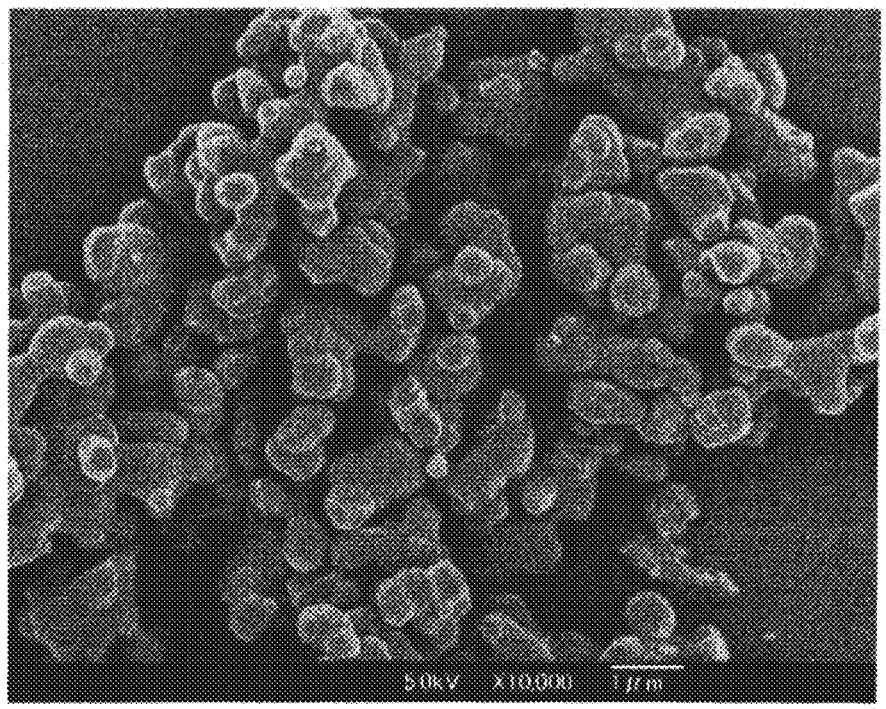

The phosphor particles were observed under an electron microscope. The electron micrograph is shown in FIG. 2. The phosphor particles were of irregular shape. An average particle size, dispersion index, roundness, bulk density, angle of repose and internal quantum efficiency were measured as in Example 1. The results are shown in Table 1.

TABLE 1

| | Average particle size, µm | Roundness | Dispersion index | Bulk density, g/cm³ | Angle of repose, ° | Internal quantum efficiency |
|---|---|---|---|---|---|---|
| Example 1 | 13 | 0.10 | 0.34 | 1.9 | 28 | 0.90 |
| Example 2 | 20 | 0.08 | 0.33 | 2.2 | 20 | 0.92 |
| Example 3 | 40 | 0.15 | 0.40 | 2.0 | 18 | 0.92 |
| Example 4 | 17 | 0.17 | 0.34 | 1.8 | 33 | 0.91 |
| Example 5 | 22 | 0.07 | 0.31 | 2.9 | 18 | 0.92 |
| Comparative Example 1 | 5.3 | 0.49 | 0.99 | 0.94 | 45 | 0.87 |

Japanese Patent Application No. 2010-131609 is incorporated herein by reference.

Although some preferred embodiments have been described, many modifications and variations may be made thereto in light of the above teachings. It is therefore to be understood that the invention may be practiced otherwise than as specifically described without departing from the scope of the appended claims.

The invention claimed is:

1. Phosphor particles of generally spherical shape comprising a garnet phase having the compositional formula (1):

$$(A_{1-x}B_x)_3C_5O_{12} \quad (1)$$

wherein A is at least one rare earth element selected from the group consisting of Y and Lu, B is at least one rare earth element selected from the group consisting of Ce, Nd, and Tb, C is at least one element selected from the group consisting of Al and Ga, and x is a number of 0.002 to 0.2, said phosphor particles having an average particle size of 13 to 50 µm and an average roundness of up to 0.3.

2. The phosphor particles of claim 1, having a particle size dispersion index of 0.1 to 0.7.

3. The phosphor particles of claim 1, having a bulk density of 1.3 to 4 g/cm³.

4. The phosphor particles of claim 1, having an angle of repose of 1 to 40°.

5. A light-emitting diode comprising a layer of the phosphor particles of claim 1 on a light emitter capable of emitting excitation light.

6. The light-emitting diode of claim 5 wherein said layer is a layer of the phosphor particles dispersed in a resin.

7. The light-emitting diode of claim 5 wherein said layer is a layer of the phosphor particles dispersed in inorganic glass.

8. An illuminating device comprising the phosphor particles of claim 1.

9. A backlight unit for use in liquid crystal panels, comprising the light-emitting diode of claim 5.

10. An illuminating device comprising the light-emitting diode of claim 5.

11. The phosphor particles of claim 1, being obtained by the method comprising a step of heat treatment in a reducing atmosphere.

12. The phosphor particles of claim 2, wherein said particle size dispersion index is 0.1 to 0.5.

13. The phosphor particles of claim 1, wherein said phosphor particles being obtained by the method comprising steps of forming a slurry of an oxide selected from the group consisting of a single metal oxide, a composite metal oxide and a mixture of metal oxides, granulating the slurry to form generally spherical granules, melting entirety of the granules and solidifying.

14. The phosphor particles of claim 13, wherein the method further comprises a step of heat treating the solidified granules in a reducing atmosphere.

* * * * *